US011449195B2

(12) United States Patent
Liusaari et al.

(10) Patent No.: US 11,449,195 B2
(45) Date of Patent: Sep. 20, 2022

(54) SYSTEMS AND METHODS FOR DYNAMIC AND INTERACTIVE VISUALIZATIONS FOR NAVIGATING MEDIA CONTENT

(71) Applicant: Spotify AB, Stockholm (SE)

(72) Inventors: Ari Liusaari, New York, NY (US); Philip Hunter McCurry, New York, NY (US); Peter Sobot, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/234,113

(22) Filed: Apr. 19, 2021

(65) Prior Publication Data

US 2021/0240330 A1 Aug. 5, 2021

Related U.S. Application Data

(63) Continuation of application No. 16/044,717, filed on Jul. 25, 2018, now Pat. No. 11,003,310.

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS

| 5,537,491 A * | 7/1996 | Mahoney ............... G06V 30/15 382/218 |
| 5,966,126 A | 10/1999 | Szabo |

(Continued)

FOREIGN PATENT DOCUMENTS

| CN | 105446607 | 3/2016 |
| EP | 2717173 | 4/2014 |

(Continued)

OTHER PUBLICATIONS

Lidy et al. "Spectralmind closed the company and open-sourced all software", http://www.spectralmind.com/tag/music-visualization (Oct. 13, 2015).

(Continued)

*Primary Examiner* — Ryan Barrett
(74) *Attorney, Agent, or Firm* — Merchant & Gould P.C.

(57) ABSTRACT

Methods, systems, and related products that provide enhanced broadening and narrowing navigation capabilities through visualized populations of items, such as media content items. Aspects of the disclosure relate to methods of identifying a population of items and groupings of those items for visualizing, via a graphical interface, in a meaningful and easily navigable configuration. Aspects of the present disclosure relate to pre-selection interactions with visualized populations to explore potential narrowing or broadening navigation actions, and selection interactions for performing a narrowing or broadening navigation.

15 Claims, 11 Drawing Sheets

(51) Int. Cl.
*G06F 3/04842* (2022.01)
*G06F 16/338* (2019.01)
*G06F 16/904* (2019.01)
*G06F 16/26* (2019.01)
*H04N 21/431* (2011.01)

(52) U.S. Cl.
CPC ............ *G06F 16/26* (2019.01); *G06F 16/338* (2019.01); *G06F 16/904* (2019.01); *H04N 21/4312* (2013.01)

(56) References Cited

U.S. PATENT DOCUMENTS

| | | |
|---|---|---|
| 7,941,336 B1 | 5/2011 | Robin-Jan |
| 9,615,136 B1 | 4/2017 | Emery et al. |
| 10,515,096 B1 | 12/2019 | Choudhary et al. |
| 11,003,310 B2 | 5/2021 | Liusaari et al. |
| 2003/0126601 A1 | 7/2003 | Roberts et al. |
| 2007/0174790 A1 | 7/2007 | Jing et al. |
| 2011/0061028 A1 | 3/2011 | Bachman |
| 2011/0113449 A1 | 5/2011 | Raine et al. |
| 2011/0283236 A1 | 11/2011 | Beaumier et al. |
| 2011/0314377 A1 | 12/2011 | Goodman et al. |
| 2012/0221553 A1 | 8/2012 | Wittmer et al. |
| 2013/0031216 A1 | 1/2013 | Willis et al. |
| 2013/0110838 A1 | 5/2013 | Lidy et al. |
| 2013/0145327 A1 | 6/2013 | Rinearson et al. |
| 2013/0178962 A1 | 7/2013 | DiMaria et al. |
| 2014/0047081 A1 | 2/2014 | Edwards |
| 2016/0294896 A1 | 10/2016 | O'Driscoll et al. |
| 2017/0090729 A1 | 3/2017 | Nogueira et al. |
| 2018/0364899 A1 | 12/2018 | Dogan et al. |
| 2020/0037019 A1* | 1/2020 | Liusaari ............ G06F 3/04842 |

FOREIGN PATENT DOCUMENTS

| | | | | |
|---|---|---|---|---|
| EP | 2717173 A1 * | 4/2014 | ............ | G06F 17/30 |
| WO | 01/71562 | 9/2001 | | |
| WO | 2001/071562 | 9/2001 | | |
| WO | WO-0201846 A1 * | 1/2002 | ............ | H04L 12/10 |

OTHER PUBLICATIONS

Unknown. "Music Popcorn—A visualization of the music genre space", https://musicmachinery.com/2013/09/22/5025/ (Sep. 22, 2013).
Extended European Search Report from corresponding European Appl'n No. 19185419.9, dated Oct. 30, 2019.
Monlong, "Clustering into same size clusters," Jun. 9, 2018, http://jmonglong.github.io/Hippocamplus/2018/06/09; cluster-same-size/.
Banerjee et al., "Model Based Overlapping Clustering," Aug. 2005, KDD '05: Proceedings of the eleventh ACM SIGKDD international conference on Knowledge discovery in data mining, pp. 532-537, https://doi.org/10/1145/1081870.1081932.
Bonacich, "Technique for Analyzing Overlapping Memberships," 1972 Wiley, Sociological Methodology, vol. 4, pp. 176-185, https://www.jstor.org/stable/270732.
Cytoscape, "PINA4MS Details," http://apps.cytoscape.org/apps/pinarms#cy-app-details-tab.
Cytoscape, "PINA4MS Release History," http://apps.cytoscape.org/apps/pinarms#cy-app-releases-tab.
Cytoscape, "PINA4MS User Guide 1.1," http://omics.jbcancer.org/pina/download/PINA4MS-UserGuide_1.1.pdf.
Mishra et al., "On Finding Large Conjunctive Clusters," Aug. 24-27, 2003, Learning Theory and Kernal Machines: 16 Annual Conference on Computational Learning Theory and 7th Kernel Workshop, https://rd.springer.com/chapter/10.1007/978-3-540-45167-9_33.
European Communication pursuant to Article 94(3) EPC in Application 19185419.9, dated Oct. 5, 2021, 11 pages.

* cited by examiner

SYSTEMS AND METHODS FOR DYNAMIC AND INTERACTIVE VISUALIZATIONS FOR NAVIGATING MEDIA CONTENT

CROSS REFERENCE TO RELATED APPLICATIONS

This application is a Continuation of U.S. application Ser. No. 16/044,717 filed 25 Jul. 2018, and which application is incorporated herein by reference. To the extent appropriate, a claim of priority is made to the above disclosed application.

TECHNICAL FIELD

The present disclosure relates to technical solutions for providing dynamic and interactive visualizations for navigating media content.

BACKGROUND

With the increasing availability and quantity of media content, navigating media content in a meaningful and efficient way is becoming increasingly challenging. There is a need for tools that provide quick navigation through repositories of media content items, and easily comprehensible and modifiable classifications of the media content items.

U.S. Patent Publication No. US 2013/0110838 describes a method to organize and visualize electronic files, including visualization of media items and visual entities laid out and/or placed on a user interface according to their similarity.

U.S. Patent Publication No. US 2013/0178962 describes a user interface that determines a mood category of a media file and generates a user interface that depicts a grid or map of multiple zones, where one of the zones may occupy a position in the grid or map that corresponds to the mood category. The zone that corresponds to the mood category may be operable to perform one or more actions pertinent to the mood category.

Chinese Patent Publication No. CN105446601 describes displaying songs of a play list on a display interface in a form of song groups. The playlist can be showed in brevity.

U.S. Patent Publication No. US 2011/0314377 describes a user interface utilized to change the hierarchy, view track names, and select tracks for playback or other operations. The user interface uses an overlapping hierarchy of categories. Navigation is performed by presenting a sequence of display screens for each level of hierarchy.

The website https://musicmachinery.com/2013/09/22/5025/describes a visualization of the music genre space.

The website http://www.spectralmind.com/tag/music-visualization/describes clustering of musical files and displaying them on a user interface.

SUMMARY

The present disclosure provides systems, methods, and computer readable products that provide graphical interfaces having enhanced dynamic and interactive visualization and navigation of media content items. In this context, "dynamic" refers generally to the nature of the visualization itself, and the morphing capabilities of the visualization in response to stimuli, such as user inputs; and "interactive" refers generally to the capabilities of providing input through the interface. As used herein, an "interaction" or "interacting" with a graphical interface includes but is not limited to: a selection or selecting an object displayed via the interface. Non-limiting examples of how such a selection can be performed are described below.

Generally, the visualizations of the present disclosure are provided on a graphical interface, such as the graphical interfaces associated with many computerized products and systems. Generally, the graphical interface provides a graphical (e.g., pictorial and/or textual) representation of a data output. In some examples, the data output is generated in response to an input. The input can be provided by any of a number of input devices, such as a touch-sensitive screen, a mouse, a keypad, a voice capture and recognition system, etc. In some examples, the input is received via an interaction with a graphical element on the graphical interface, for example, by "clicking" on a particular graphical element or "hovering" a cursor over a particular graphical element, or otherwise selecting a particular graphical element.

The principles of the present disclosure can be applied to navigating through a corpus of items. The items are stored in a digital format and can be of a variety of types. In some examples, the items are media content items, such as music tracks, videos, books, articles, social media posts, etc. Other non-limiting examples of the items include recipes, names of people, names of organizations, vehicles, or any logical grouping of items. It should be appreciated that the principles of the present disclosure are readily applied to any such corpus of items. However, for ease of explanation only, the description that follows will be provided in the context of a corpus of media content items and, more particularly, to a corpus of music tracks.

In some examples, principles of the present disclosure are applied to a corpus of music tracks associated with a particular user. In some examples, the music tracks are associated with the particular user due to the user's known, perceived, and/or predicted affinity for the music tracks. Systems and algorithms for identifying such so-called "affinity" tracks of a given user are known and described, for example, in U.S. Patent Publication Nos. 2017/0270125 and 2017/0169107, the contents of which patent applications are hereby incorporated by reference in their entirety.

As used herein, the term "user" refers to either the entity (e.g., a consumer of music content) with which a universe or corpus of items (e.g., music tracks) is associated, or the entity that is navigating through populations of items from that corpus or universe. Thus it can be the same user or a different user that is associated with a corpus or universe of items on the one hand, and that navigates populations of items from that corpus or universe on the other hand.

Additional aspects of the present disclosure relate to selection of the initial corpus of items to work with. As already mentioned, one example limiting factor in selecting the initial corpus is (for music track items) including only affinity tracks associated with a given user. Other limiting factors can also be applied in selecting the initial corpus. For example, only tracks that meet or exceed a threshold level of user affinity are included in the initial corpus. In another example, the initial corpus must meet or exceed a predefined minimum number of items and/or not exceed a predefined maximum number of items. For example, the initial corpus must include at least 100 items and no more than 10,000 items. Different limiting factors can also be applied together in an algorithmic relationship. For example, the predefined threshold level of affinity is at least partially predicated on the need to meet the number of items limitations for the initial corpus. Thus, for example, the threshold affinity level must be low enough such that at least 100 items are included in the initial corpus, and high enough such that no more than 10,000 items are included in the initial corpus.

The systems, methods, and computer readable products of the present disclosure serve a variety of technical advantages and improvements over existing technologies and, particularly, over existing computer technologies directed to navigating through groups of items in meaningful ways, as well as visualizing groupings of large numbers of items in meaningful ways.

For example, aspects of the methods, systems, and computer readable products of the present disclosure serve the technical advantage of improving how a machine represents and presents large numbers of items in an easily digestible and navigable way. In some examples, the methods, systems, and computer readable products of the present disclosure use rules to optimize visualizations of groupings of large numbers of items in response to interactions seeking visual representation of different items or different groupings of items.

Additional aspects of the methods, systems, and computer readable products of the present disclosure serve the further technical advantage of improving how a machine identifies a relevant population of items for visualization and navigation, where the population is a subset of a corpus of items or a universe of items.

Additional aspects of the methods, systems, and computer readable products of the present disclosure serve the further technical advantage of improving how a machine responds to specific types of user input, including improving the efficiency with which the machine responds to the specific types of user input.

Additional aspects of the methods, systems, and computer readable products of the present disclosure serve the further technical advantage of improving how to select a subset of media content items stored on one or more storage devices for interactive graphical representation via a graphical interface, and how those graphical representations can be interacted with using the graphical interface to provide desirable outputs, such as playback of media content items via a media playback device.

According to certain aspects of the present disclosure, a system comprises one or more processors adapted to provide, via a graphical interface, a graphical display, a first graphical element of the graphical display representing a first grouping of media content items from a corpus of media content items stored in at least one storage device, and a second graphical element of the graphical display representing a second grouping of media content items from the corpus of media content items; wherein the first graphical element and the second graphical element partially overlap in an overlap region of the graphical display; and wherein interacting, via the graphical interface, with the overlap region causes a playback, a media playback device, of at least a portion of a media content item that is in both the first grouping and the second grouping.

According to further aspects of the present disclosure, a non-transitory computer-readable medium comprises one or more sequences of instructions that, when executed by one or more processors, causes the one or more processors to: provide, via a graphical interface, a graphical display, a first graphical element of the graphical display representing a first grouping of media content items from a corpus of media content items stored on at least one storage device, and a second graphical element of the graphical display representing a second grouping of media content items from the corpus of media content items, the first graphical element and the second graphical element partially overlapping in an overlap region of the graphical display; and, in response to an interaction, via the graphical interface, with the overlap region, cause a playback of at least a portion of a media content item that is in both the first grouping and the second grouping.

According to further aspects of the present disclosure, a system comprises one or more processors adapted to: select, from a corpus of items stored on at least one storage device, a population of items to be represented on a graphical display of a graphical interface; choose at least first and second groupings of items from the population of items, each of the first and second groupings having at least a predefined minimum number of the items relative to the population and at most a predefined maximum number of the items relative to the population; display, via the graphical interface, a first graphical element representing the first grouping of items; and display, via the graphical interface, a second graphical element representing the second grouping of items; wherein the first graphical element and the second graphical element partially overlap on the graphical display.

According to further aspects of the present disclosure, a non-transitory computer-readable medium comprises one or more sequences of instructions that, when executed by one or more processors, causes the one or more processors to: select, from a corpus of items stored on at least one storage device a population of items to be represented on a graphical display of a graphical interface; choose at least first and second groupings of items from the population of items, each of the first and second groupings having at least a predefined minimum number of the items relative to the population and at most a predefined maximum number of the items relative to the population; provide, via the graphical interface, a first graphical element representing the first grouping of items; and provide, via the graphical interface, a second graphical element representing the second grouping of items; wherein the first graphical element and the second graphical element partially overlap on the graphical display.

According to further aspects of the present disclosure, a system comprises one or more processors adapted to: select a population of items from a corpus of items stored on at least one storage device to be represented on a graphical display of a graphical interface; and choose at least first and second groupings of items from the population of items, wherein the choosing includes one or more of: a) maximizing the number of items from the population within at least one of the groupings; b) excluding a pair of groupings that share more than a predefined threshold number of items, optionally, where the predefined threshold number is relative to the population or relative to the number of items in at least one of the pair of groupings; and c) identifying at least two groupings that differ from each other in number of items by less than a predefined threshold number of items, optionally, where the predefined threshold number is relative to the population or relative to the number of items in at least one of the at least two groupings.

According to further aspects of the present disclosure, a method comprises: selecting a population of items from a corpus of items stored on at least one storage device to be represented on a graphical display of a graphical interface, and choosing at least first and second groupings of items from the population of items, wherein the choosing includes one or more of: a) maximizing the number of items from the population within at least one of the groupings; b) excluding a pair of groupings that share more than a predefined maximum threshold number of items; c) excluding a pair of groupings that share less than a predefined minimum threshold number of items; and d) identifying at least two groupings that differ from each other in number of items by less than a predefined threshold number of items relative to the population or relative to the number of items in at least one of the at least two groupings.

According to further aspects of the present disclosure, a non-transitory computer-readable medium comprises one or more sequences of instructions that, when executed by one or more processors, causes the one or more processors to: select a population of items from a corpus of items stored on at least one storage device to be represented on a graphical display; and choose at least first and second groupings of items from the population of items, wherein the choosing includes one or more of: a) maximizing the number of items from the population within at least one of the groupings; b) excluding a pair of groupings that share more than a predefined threshold number of items optionally, where the predefined threshold number is relative to the population or relative to the number of items in at least one of the pair of groupings; and c) identifying at least two groupings that differ from each other in number of items by less than a predefined threshold number of items, optionally, where the predefined threshold number is relative to the population or relative to the number of items in at least one of the at least two groupings.

BRIEF DESCRIPTION OF THE DRAWINGS

The features and advantages of the present disclosure will become more apparent from the detailed description set forth below when taken in conjunction with the following drawings. Throughout the several figures and embodiments, like components are referred to by like reference numbers unless otherwise indicated.

DETAILED DESCRIPTION

The example embodiments presented herein are directed to systems, methods, and non-transitory computer-readable medium products that enhance navigation through a corpus or universe of related items. The example embodiments described are for convenience only, and are not intended to limit the application of the present invention. After reading the following description, it will be apparent to one skilled in the relevant art how to implement the following disclosure in alternative embodiments.

Figure 1:
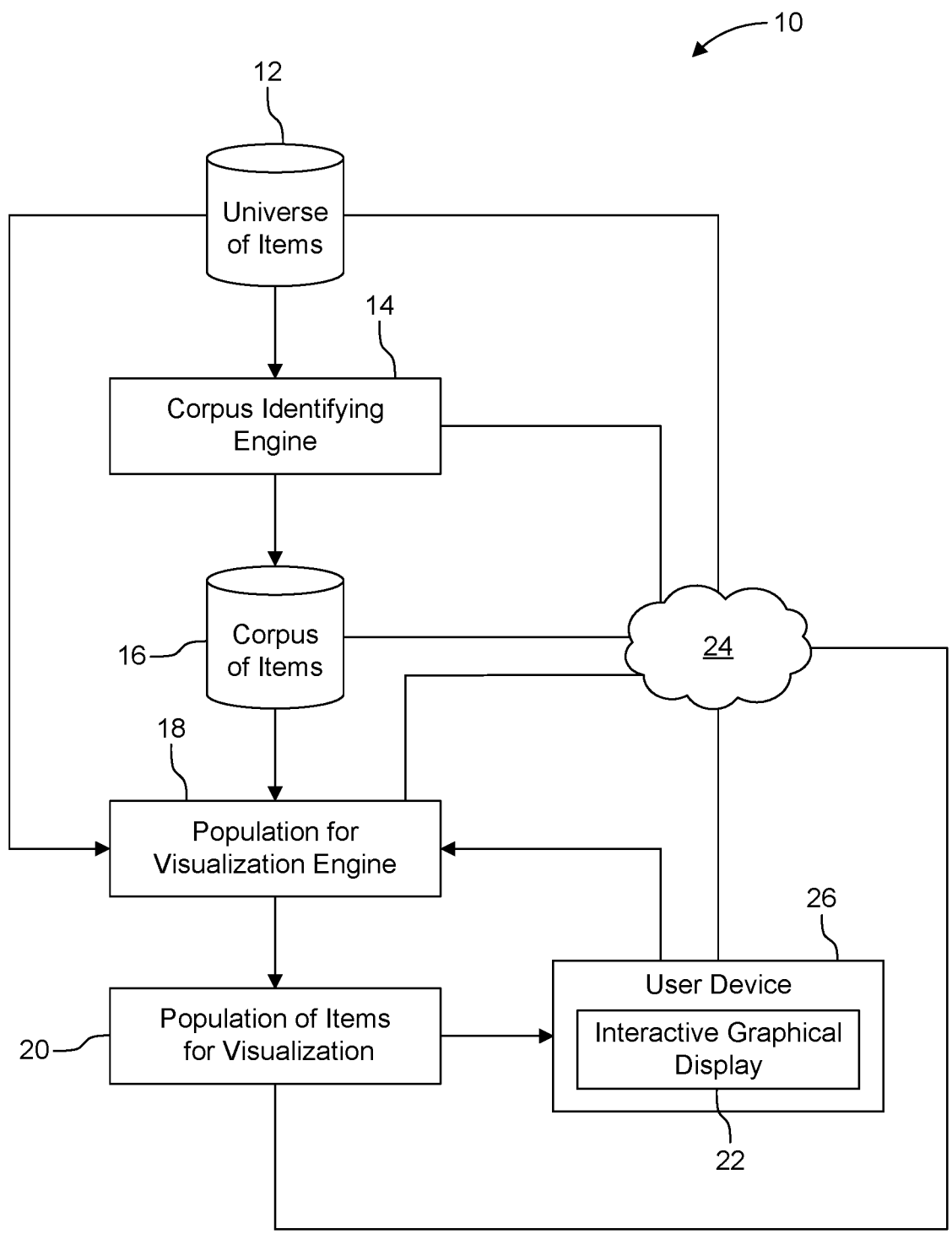
FIG. 1 schematically illustrates components of an example system in accordance with the present disclosure.

FIG. 1 schematically illustrates components of an example system 10 in accordance with the present disclosure. The various components are communicatively coupled, e.g., via a network 24. The components of the system 10 reside in a single location, or across multiple locations. For example, all of the components reside in a single user device, such as a desktop or a laptop computer, a smart phone, a tablet, a device associated with a vehicle for providing playback of media content in the vehicle, etc. In another example, the components of the system 10 reside in two or more devices, such as a user device, one or more servers positioned remotely from the user device, and/or one or more databases located remotely from the user device and/or the one or more servers.

The system 10 includes a universe of items 12 and a corpus identifying engine (CIE) 14, which provides, from within the universe of items 12, a corpus of items 16. In an example, the universe of items are stored on one or more databases or other storage devices.

The system 10 also includes a population for visualization engine (PVE) 18, which provides, from within the corpus of items 16, a population 20 of items for visualization. The system 10 also includes an interface that includes a graphical display 22. The graphical display 22 is adapted to visually display graphical elements representing the population 20 of items for visualization. In at least some examples the graphical elements are interactive via the device interface. In at least one example, the graphical display 22 and corresponding interface are included in a user device 26. The user device 26 includes one or more input and/or output devices. Example input devices include a touch-sensitive screen, a mouse, a keypad, a microphone for receiving voice commands, etc. Example output devices include media output devices such as the graphical display 22 and a speaker.

In a particular example, the universe of items 12 includes N1 tracks, N1 being a positive integer representing the total number of available tracks. The CIE 14 identifies a corpus of tracks N2 from the N1 tracks, where N2 is a positive integer less than N1. In selecting the corpus of items 16, the CIE 14 applies one or more filtering rules. According to one such rule, the CIE 14 selects tracks from the universe of tracks that meet or exceed a predefined threshold affinity by a user (e.g., a consumer of music content) of one or more of the universe of tracks. In selecting the corpus 16, the CIE 14 also applies parameters such as predefined minimum and maximum values for N2. For example, if N2 must include at least 100 tracks and only 90 tracks from the universe of items meet the predefined threshold affinity, the CIE 14 is adapted to include in the corpus 16 the 10 tracks from the universe 12 of next greatest affinity.

The PVE 18 selects N3 items from the corpus 16 to visually represent on the graphical display 22, where N3 is a positive integer less than or equal to N2. As described in more detail below, it should be noted that one or more of the N3 items can be visually represented more than once in a single display.

In some examples, the system 10 bypasses the CIE 14, and the PVE 18 selects items for visual representation directly from the universe 12. This happens, for example, when the N1 items in the universe already meet sufficient predefined criteria to qualify as candidates for visualization.

The PVE 18 uses one or more rules to select the population 20 for visual representation. In at least some examples, the visualization divides the population into at least two groupings. Thus, the rules that select the population 20 are based, at least in part, on how that population will be divided into different groupings to be visualized.

A first example rule identifies the population 20 by, at least in part, maximizing the number of items that will be represented in one of the groupings of items to be visualized.

A second example rule identifies the population 20 by, at least in part, excluding pairs of groupings that share more than a predefined maximum threshold number of items, and/or by excluding pairs of groupings that share less than a predefined minimum threshold number of items. In some examples, the pre-defined maximum threshold number and/or the predefined minimum threshold number is/are determined, at least in part, as a function of the total number of items in the population or as a function of the total number of items in at least one of the pairs of groupings. Thus, in some examples, the predetermined minimum or maximum number of items allowed to be shared between two groupings is a function of the total number of items to be represented on the visual display.

A third example rule identifies the population 20 by, at least in part, identifying at least two groupings that differ from each other in number of items by less than a predefined threshold number of items relative to the population or relative to the number of items in at least one of the at least two groupings.

A fourth example rule identifies the population 20 by, at least in part, identifying no more than a predefined maximum number of groupings to be visually represented at one time.

These example rules are non-limiting. In addition, it should be appreciated that the PVE can apply more than one such rule, or a combination of rules, to identify the population 20.

In addition, it should be appreciated that "predefined thresholds" as described herein represent one example metric for evaluation of candidate groupings by the PVE 18. In other examples, the PVE 18 applies a plurality (e.g., 2, 3, 4, 5, or more) of rules to each candidate grouping. Application of each rule generates a score reflecting the degree to which the candidate grouping meets the rule's criteria. The scores for each candidate grouping are summed across all the applied rules, and a set of the highest overall scoring candidate groups are selected by the PVE 18 for the population 20.

Using one or more rules, the PVE 18 is adapted to provide a visual display with enhanced navigation attributes by, e.g., visually representing items in groups of meaningful and/or manageable size (i.e., not too large, not too small and/or of comparable size to one another), visually representing items in a meaningful and/or manageable number of groups (i.e., not too many groups and not too few groups), and/or visually representing items that take into account different classification schemes of items, as described in more detail below.

Optionally, each rule identifies candidate groupings according to one or more classification schemes. A classification scheme is a way of classifying one or more items. A given item can be classified more than one way. For example, the same music track can be classified typologically as "Jazz", stylistically as "Acoustic", geographically as "American", and chronologically as "1920's". In addition, for a given class within a given classification scheme, the class can include one or more sub-classes and/or one or more super-classes within the same scheme. For example, sub-classes of "American" include "New York" and "Chicago"; and super-classes of "American" include "North American" and "Western". The classification schemes, classes, sub-classes and super-classes described herein are not limiting.

The following example scenario illustrates some functionalities of the foregoing four example rules. For purposes of this example scenario, the corpus 16 includes ten tracks. According to one type of classification scheme (an artist region scheme), the ten tracks include five tracks by North American artists, two tracks by European artists, two tracks by African artists, and one track by an Asian artist. Within a classification scheme, tracks can be further defined or tagged. For example, of the five North American tracks, two are Mexican (i.e., by Mexican artists), one is Canadian, and two are from the U.S. Of the two U.S. tracks, one is from New York, and one is from California. Of the two European tracks, one is from the United Kingdom and one is from Germany. Of the two African tracks, one is from Morocco and one is from Kenya. The one Asian track is from China.

According to another classification scheme (a music genre scheme), of the ten tracks, six are Pop tracks and four are Rap tracks.

Each item in the corpus 16, and also in the universe 12, is tagged with one or more tags that represent the classes that the item belongs to. For example, a single item is tagged with a North America tag, a U.S. tag, a New York tag, and a Rap tag. The tags are stored as attributes linked to their respective item. Thus, for example, when an item from the universe 12 appears in the corpus 16, its class tags remain linked to the item in the corpus 16.

Tags become associated with items in any suitable way. In some examples, they are entered by a user. In some examples, the tags are metadata that is, from creation of the item, always associated with that item. In some examples, tags are derived, e.g., using a machine learning model, and then attached to the appropriate item(s).

The rules applied by the PVE 18 determine which of the items in the corpus 16 to include in the visually represented population 20. The rules select the items for the population 20 based in part on how the items can be grouped for the visualization, which in turn is based on the class tags associated with the items.

The number of distinct items selected for the population 20 is less than or equal to the total number of items in the corpus 16. However, the same item from the corpus can be repeated in the population 20 in multiple groupings. Thus, the total number of items in the population 20, in some examples, exceeds the number of items in the corpus 16.

Applying only the first rule to this corpus 16 of ten tracks, the PVE 18 selects at least the six pop tracks to be included in the population, since these six pop tracks represent the largest single classification grouping from the corpus of ten items, and therefore can be considered the primary grouping determined by the PVE 18. The primary grouping is then visually represented on the display 22. The PVE 18, in some examples, also selects one or more additional or secondary groupings of the ten corpus items to include in the population 20. In some examples, one or more of the secondary groupings include items that overlap with the primary grouping. For example, the PVE 18 includes in the population 20 tracks within an Africa grouping and one of the two tracks classified as Africa is one of the six Pop tracks (the other of the two Africa tracks being a rap track). In some examples, one or more of the secondary groupings do not include any items that overlap with the primary grouping. For example, the PVE 18 includes in the population 20 items within a U.S. grouping and the two items that are classified as U.S. are Rap tracks, and therefore do not overlap with the grouping of Pop tracks.

Applying one aspect of the second rule to this corpus 16 of ten tracks, for purposes of this example, the predefined maximum threshold number of shared items between two groupings is one. In some examples, the predefined maximum is at least partially a function of the total number of items in the population 20 (in this case ten) and/or the total number of items in the corpus 16 and/or the number of items in the groupings themselves. For example, as the population increases in number of items, so does the predefined maximum threshold of shared items between two groupings from that population.

Returning to the example, the PVE 18 identifies candidate items for the population 20 that can be grouped without any two of the groupings including more than one item that is the same. For example, of the four Rap tracks, two are tagged as U.S., one as Africa, and one as Europe. Thus, for example, the second rule generates a population 20 that includes a Rap grouping and a Europe grouping; or a Rap grouping and an Africa grouping; or a Rap grouping, a Europe grouping, and an Africa grouping; or a Rap grouping and a Pop grouping, etc. However, the rule will not generate a population that has groupings that include a Rap grouping and a U.S. grouping, since these two groupings share more than one item.

Applying the third rule to this corpus 16 of ten tracks, the PVE 18 identifies the population 20 by including in that population groupings that have comparable numbers of items. In this particular example, the number of items in any of the groupings is preset to differ by no more than two. In some examples, this preset maximum differential is at least partially a function of the total number of items in the population 20 (in this case, ten) and/or the total number of items in the corpus 16 and/or the number of items in the groupings themselves. For example, as the population increases in number of items, so does the maximum preset differential between two groupings from that population.

In this particular scenario, one possible set of groupings for the population 20 generated by the PVE 18 includes a Rap grouping and a Pop grouping, since these groupings differ by no more than two items. Another possible set of groupings is a Europe grouping, an Asia grouping, and an Africa grouping. Another possible set of groupings is a U.S. grouping and a Rap grouping. An example of an unacceptable set of groupings (i.e., one that would not be generated by the PVE 18 in this scenario) would be a Pop grouping and a Europe grouping, since these groupings differ in number of items by more than two.

Applying the fourth rule, it can be assumed for this scenario that the maximum number of groupings for the population 20 is three, i.e., no more than three groupings of items from the corpus 16 may be visually represented at one time. According to this example, the PVE 18 could generate a population 20 consisting of three or fewer groupings (e.g., Non-Europe group, a Pop group, and a Rap group; or a New York group and a California group), but not a population consisting of four or more groups (e.g., a North America group, a Europe group, an Africa group, and an Asia group).

As mentioned, two or more rules can be applied by the PVE 18 simultaneously and according to an overall rule scoring system rather than, or in addition to, thresholds defined for individual rules. Typically, applying multiple rules will reduce the number of viable grouping set candidates for visualization to feed to the graphical display 22. If more than one viable grouping set candidate is identified by the PVE 18, in some examples a single one of the candidates is selected for visualization by a randomizer, or according to one or more conflict resolution rules configured to select one of the viable grouping set candidates. In some examples, the single grouping set candidate is selected based on one or more parameters, such as user affinity for particular groupings.

As mentioned, the specific population determination rules described herein are non-limiting. In another example rule, the PVE 18 selects a population and groupings of the items in the population in part based on user activity, e.g., recent user activity. For example, supposing Rock and Reggae are both viable grouping candidates to visualize with a set of other groupings, but a parameter by which the PVE 18 must abide precludes visualizing of both Rock and Reggae groupings for this population, as this would make the overall visualization too cluttered. In this example, the PVE 18 selects Reggae over Rock to visualize because the PVE 18 determines that the user has listened to more Reggae tracks within a previous predefined period of time than Rock tracks, and so Reggae tracks are deemed by the PVE 18, as a grouping, to have a higher recent affinity than Rock tracks.

It should be appreciated that the PVE 18 is configured to optimize the appearance of the visualization. Thus, to the extent application of any rule or set of rules would result in a non-optimal visualization, such rules are ignored or minimized. Moreover, upon each population altering interaction with the interface (e.g., selection of a bubble region or a toggle), the PVE 18 performs a reevaluation within the parameters set by the interaction (e.g., to see a narrower population or a broader population) to provide an optimized visualization of item groupings.

The population 20 is fed to a user device 26 for display on a graphical display 22. The display 22 has interactive capabilities. Graphics that appear on the display 22 when the user device 26 is fed the population 20 will now be described in greater detail in connection with FIGS. 2-10.

Figure 2:
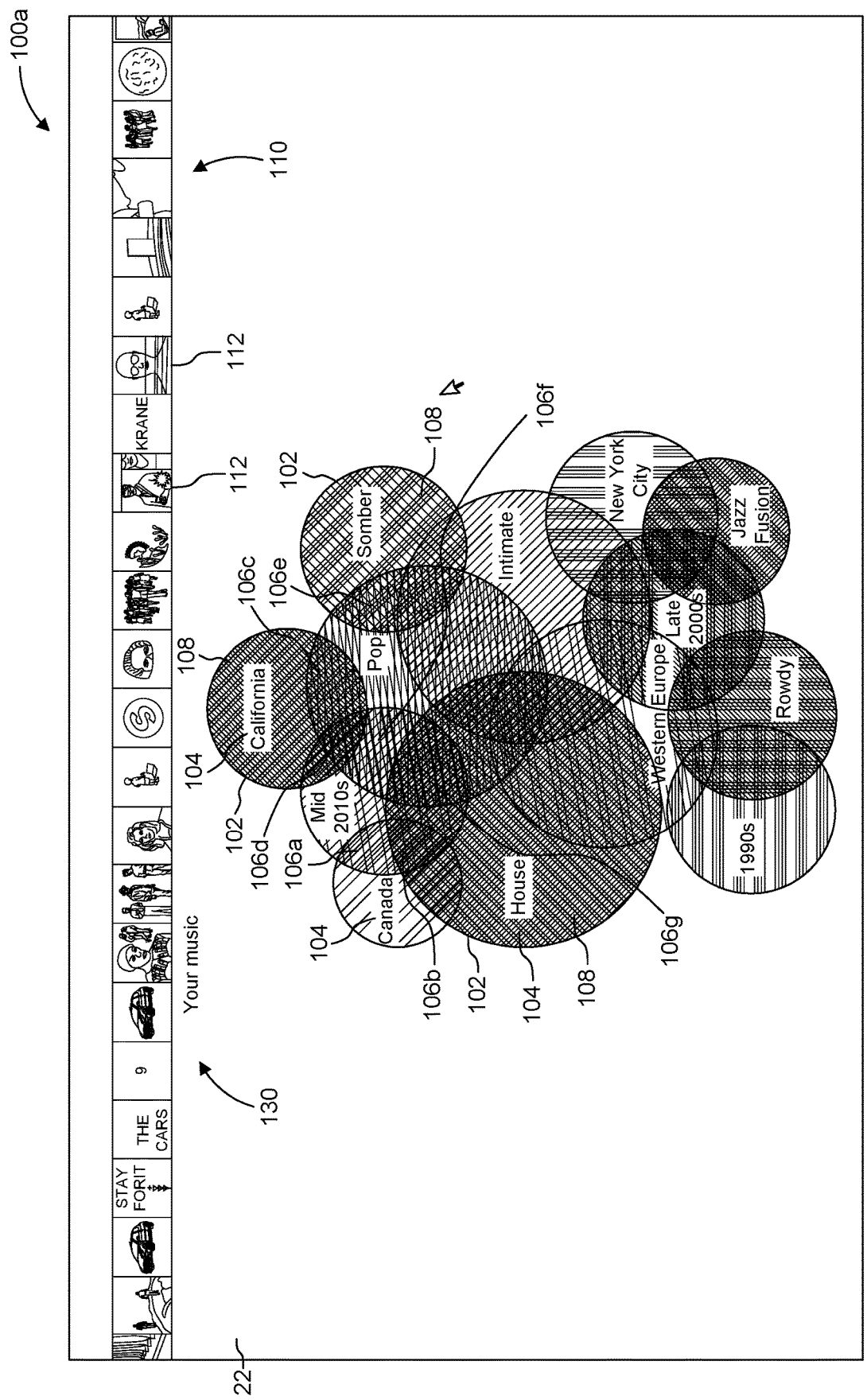
FIG. 2 depicts an example visualization on a graphical display in accordance with the present disclosure.

FIG. 2 depicts an example visualization 100a of groupings of items from a population 20 (FIG. 1) identified by the PVE 18 (FIG. 1). The items in the visualized groupings are a subset of items from a corpus of items 16 (FIG. 1) associated with a particular user, in this case a consumer of music tracks, that have met one or more criteria, such as a predetermined minimum level of user affinity. The items represented in the visualization 100a are music tracks. Each item (or track) is associated with one or more class tags that correspond to the groupings under which that track can be visualized.

Each grouping is represented by a graphical element 102. In the depicted embodiment, the graphical elements 102 are circular and will be referred to as bubbles. The various attributes of the graphical elements 102, such as the shape, color, and other visual effects, are merely examples and not meant to be limiting. The bubbles 102 are visually distinguishable by, e.g., color, shade, size, and/or positioning away from another of the bubbles. In at least some examples, generation of the visualization is restricted such that no bubble completely eclipses another bubble on the display, which could occur if the two bubbles represent the exact same set of items.

All of the items collectively represented by the bubbles 102 in FIG. 2 constitute a first population 20 (FIG. 1) of items generated by the PVE 18 (FIG. 1).

Each bubble 102 corresponds to a grouping of tracks. The class tag 104 corresponding to the grouping appears as text in the respective bubble 102. The visualization 100a includes a bubble 102 for each of the following groupings or tags: California, Canada, Mid 2010's, Pop, Somber, House, Intimate, Western Europe, Late 2000s, New York City, 1990s, Rowdy, Jazz Fusion. As can be appreciated, these tags fall within different classification schemes. For example, Canada and New York City fall within a geographical scheme, while Intimate and Rowdy fall will within a mood scheme.

The bubbles 102 are sized according to the number of tracks they represent. For example, the House bubble 102 represents more tracks than the 1990s bubble 102, and so the House bubble is larger than the 1990s bubble. The size of the bubbles can be a function of the number of tracks represented by those bubbles according to any suitable function. For example, the surface area or diameter of the bubble is a linear function of the number of tracks represented by that bubble or a linear function of the proportion of tracks represented by that bubble of the total population that is presently visualized. In other examples, the surface area or diameter of the bubble is a logarithmic function of the number of tracks represented by that bubble or a logarithmic function of the proportion of tracks represented by that bubble of the total population that is presently visualized.

The visualization includes overlap regions between groups of two or more bubbles where those bubbles intersect. A few of these overlap regions are indicated in FIG. 2 as reference numbers 106a, 106b, 106c, 106d, 106e, 106f, and 106g (generically or collectively, 106). The overlap regions 106 are shaded and/or colored differently than the corresponding non-overlap regions 108 of the corresponding bubbles that intersect to form the overlap region. The size of each overlap region 106 is in some examples a function of one of: the number of tracks represented by the overlap region 106 (measured as a raw number or as a proportion of the total number of tracks in the population being visualized), and/or the size of the intersecting bubbles 102.

The tracks represented by each overlap region 106 are those tracks that fall under all of the groupings or tags that intersect to form that overlap region. Thus, for example, the tracks represented by the overlap region 106a are Mid 2010s tracks from Canada. The tracks represented by the overlap region 106g are Pop House tracks from the Mid 2010s.

In some examples, the spacing between two non-overlapping bubbles indicates or suggests some relationship between those bubbles. For example, separation of non-overlapping bubbles depends on the number of items represented by those bubbles. For example, a bubble representing five items is spaced farther from a given non-overlapping bubble than a bubble representing ten items is spaced from the same non-overlapping bubble. In some examples, groupings are selected for a visualized population such that no more than a predetermined maximum number of groupings intersect in the same overlap region. For example, groupings for visualization are selected such that no more than three of the groupings share one or more tracks. In the visualization 100a, there are overlap regions 106 of two bubbles 102 and of three bubbles 102, but not of more than three bubbles.

The bubbles 102 are interactive. For example, pre-selecting a non-overlapping region 108 of a bubble 102 by hovering a cursor over that non-overlapping region causes the system 10 (FIG. 1) and/or the user device 26 (FIG. 1) to initiate and execute playback of a track represented by that bubble. If the bubble represents more than one track, in some examples a randomizer is used to randomly select one of the represented tracks for playback. In other examples, the track represented by the bubble that has the highest user affinity is selected for playback. A subsequent interaction with the same region can cause playback of the same track or of a different track represented by that bubble.

Pre-selecting or a pre-selecting interaction refers to an exploratory interaction by a user with a region of the visualization to determine if the user wishes to navigate items specifically within that region or, rather, explore another region instead, by gleaning certain information about the pre-selected region.

In some examples, the items available for playback when interacting with a given region are not just specific to the bubble, but specific to the region. For example, pre-selecting a non-overlapping region 108 by hovering a cursor over the non-overlapping region of the Somber bubble 102 causes playback of a Somber track but not a Pop or Intimate track. In other examples, pre-selecting a non-overlapping region could also cause playback of a track represented in an overlapping region of the same bubble.

Similarly, interacting (e.g., hovering a cursor) over an overlap region 106 causes playback of a track that falls within all of the bubbles that intersect to form the pre-selected overlap region 106.

If the pre-selected region represents more than one track, in some examples a randomizer is used to randomly select one of the represented tracks for playback. In other examples, the track represented by the region that has the highest user affinity is selected for playback. A subsequent interaction with the same region can cause playback of the same track or of a different track represented by that bubble.

The visualization 100a also includes a content summary element 130 and an item sample array 110.

The content summary element 130 indicates a level of granularity represented by the current visualization. The text "Your Music" of the summary element 130 indicates that all music tracks in a user's playlist are represented by the bubbles 102 presently visible on the visualization 100a, or that all music tracks that meet one or more criteria, such as minimum affinity, are represented by the bubbles 102 presently visible on the visualization 100a.

The item sample array 110 includes one or more pictorial elements 112 that correspond to samples of the music tracks represented by the bubbles 102. In this example, each pictorial element 112 is a representation of an album cover that includes a track represented by one of the bubbles 102. In some examples a randomizer is used to determine which music tracks to represent in the item sample array 110. In some examples, each item is associated with a pictorial element 112, i.e., the pictorial element is a type of metadata associated with each item in the universe 12 (FIG. 1).

In some examples, the pictorial elements 112 are interactive. For example, clicking on or hovering over a specific pictorial element 112 causes the system 10 (FIG. 1) and/or the user device 26 (FIG. 1) to initiate and execute playback of a track from that album that is also represented by one or more of the bubbles 102. If the album includes more than one track represented by the bubbles 102, in some examples a randomizer chooses one of those tracks for playback when the corresponding pictorial element 112 is interacted with. Alternatively, the track caused to be played back is the one with highest user affinity.

Figure 3:
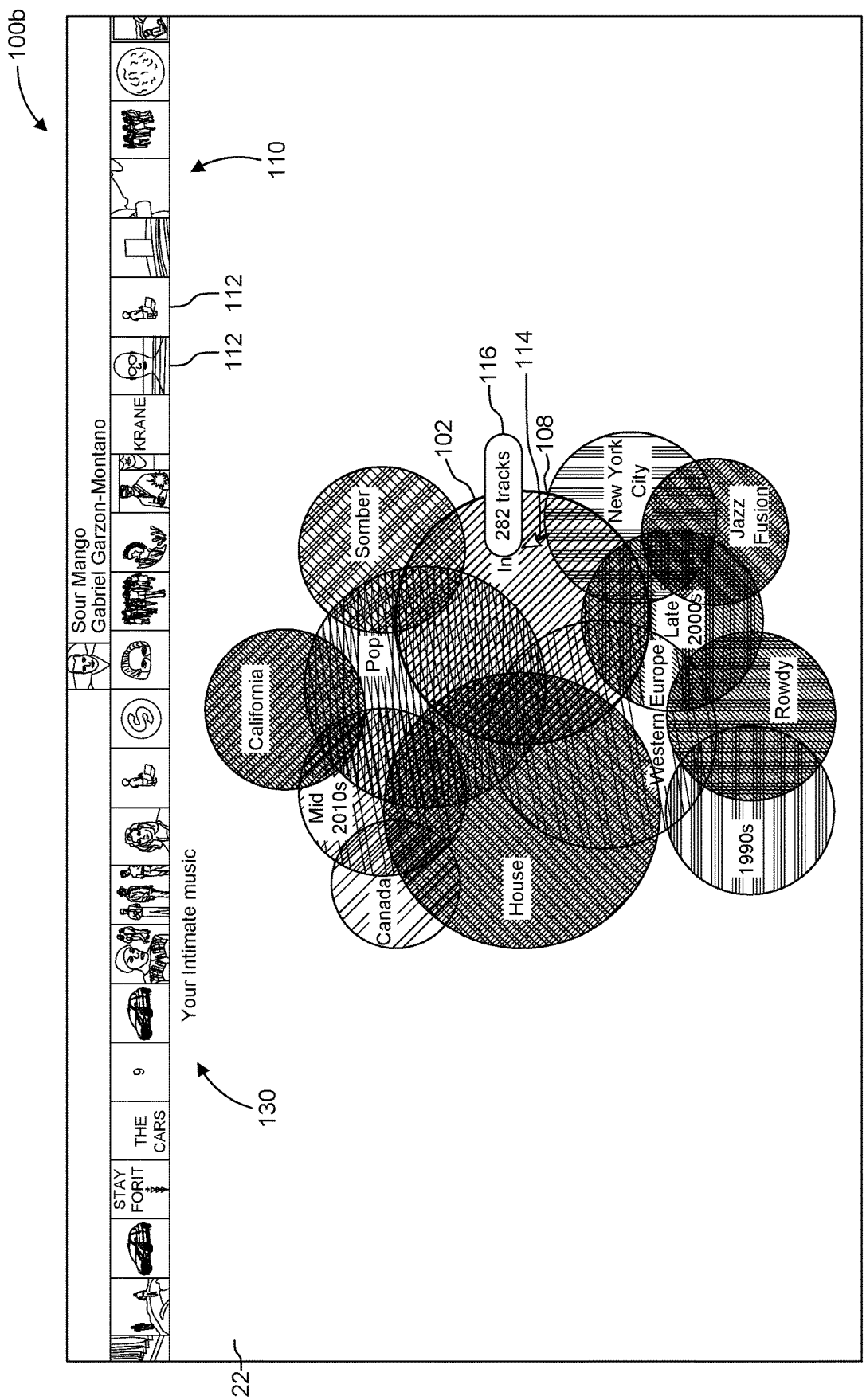
FIG. 3 depicts a further example visualization on a graphical display in accordance with the present disclosure.

Referring now to FIG. 3, a visualization 100b is depicted. The overall population of items represented by the bubbles 102 in the visualization 100b is the same as that of visualization 100a. Thus, the PVE 18 (FIG. 1) is not needed to generate the visualization 100b from the visualization 100a (FIG. 2).

The visualization 100a of FIG. 2 morphs into the visualization 100b of FIG. 3 when a user interacts in a particular way with the visualization that constitutes a pre-selection interaction. The interaction could be, e.g., hovering with a cursor, a single click, a double click, a voice command, etc. In some examples, the interaction is different from the type of interaction that causes playback. For example, if hovering over a region causes playback of a track represented by that region, then the interaction represented by FIG. 3 is not hovering. In other examples, a single pre-selection interaction with a region causes both playback and a morphed visualization, such as the visualization of FIG. 3.

Referring again to FIG. 3, in this particular example the cursor 114 is single clicked on the non-overlapping region 108 of the Intimate bubble 102. As a result of this pre-selection interaction, the Intimate bubble brightens or darkens (or otherwise changes in appearance), and an item number indicator 116 is displayed that indicates the number of tracks represented by the Intimate bubble, in this case 282 tracks. In addition, upon single clicking the non-overlapping region 108 of the Intimate bubble 102, the summary element 130 changes to reflect the user selection of the Intimate bubble 102. Optionally, one or more of the pictorial elements 112 representative of tracks not represented by the user-selected bubble 102 also change in appearance, e.g., by being greyed out, to reflect that no tracks in those greyed out elements are Intimate tracks.

Figure 4:
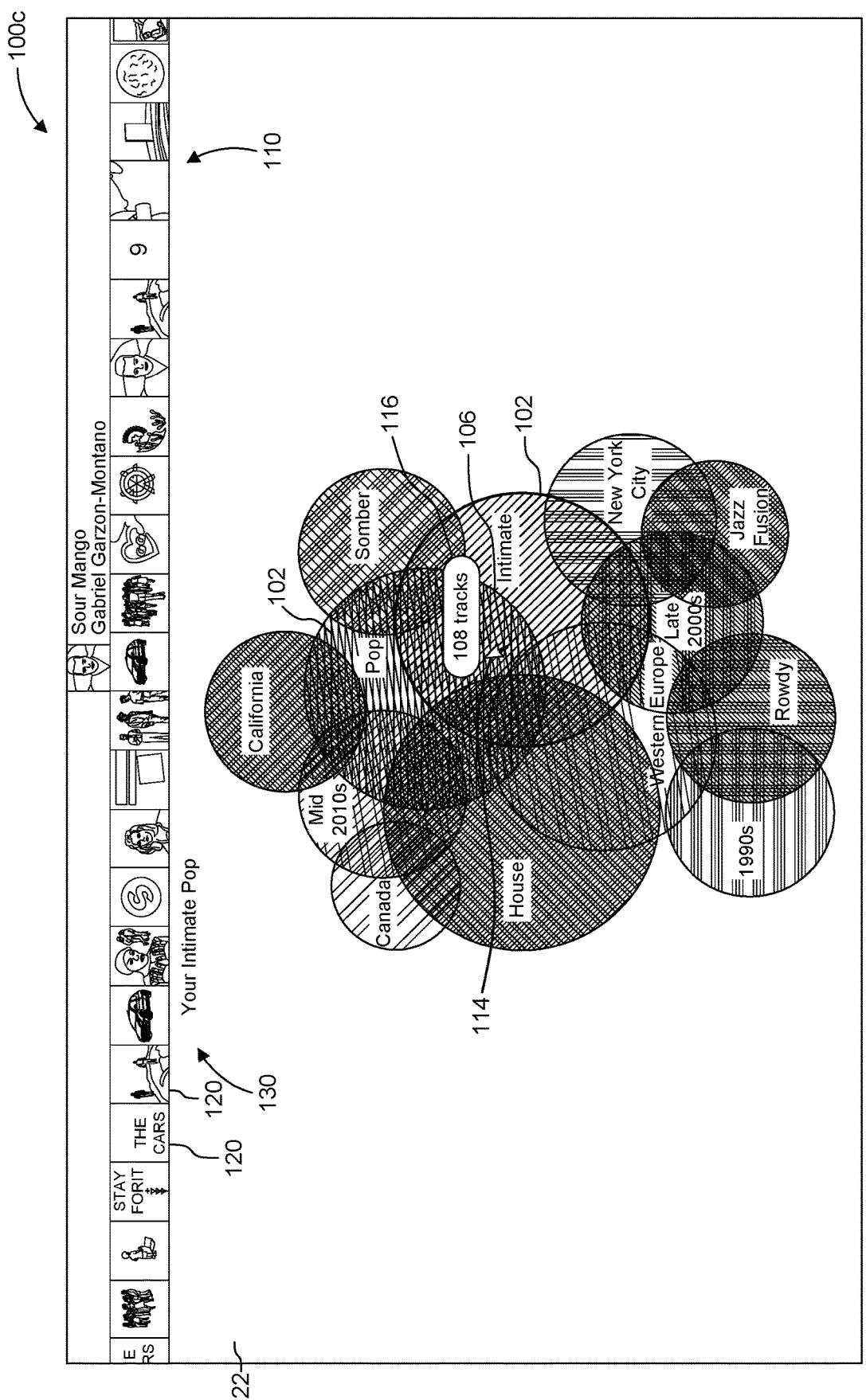
FIG. 4 depicts a further example visualization on a graphical display in accordance with the present disclosure.

Referring now to FIG. 4, a visualization 100*c* is depicted. The visualization 100*b* of FIG. 3 morphs into the visualization 100*c* of FIG. 4 when a user interacts in a particular pre-selection manner with the visualization. The overall population of items represented by the bubbles 102 in the visualization 100*c* is the same as that of visualization 100*b* and 100*a*. Thus, the PVE 18 (FIG. 1) is not needed to generate the visualization 100*c* from the visualization 100*b* (FIG. 3).

In this particular example, the cursor 114 is single clicked on the overlapping region 106 that defines an intersection between the Pop bubble 102 and the Intimate bubble 102. As a result of this pre-selection interaction, the overlap region 106 brightens or darkens (or otherwise changes in appearance), and an item number indicator 116 is displayed that indicates the number of tracks shared by both the Pop bubble and the Intimate bubble, in this case 208 tracks. In addition, upon single clicking the overlapping region 106, the content summary element 130 changes to reflect the user pre-selection of Intimate Pop tracks. Optionally, one or more of the pictorial elements 120 representative of tracks not represented by the user pre-selected region 106 also change in appearance, e.g., by being greyed out, to reflect that no tracks in those greyed out elements are Intimate Pop tracks.

By, e.g., playing back a track, displaying and greying out pictorial elements 112, and/or indicating the number of tracks in a given pre-selected region, pre-selection interactions provide information that assists in determining what region to select for further navigation.

Figure 5:
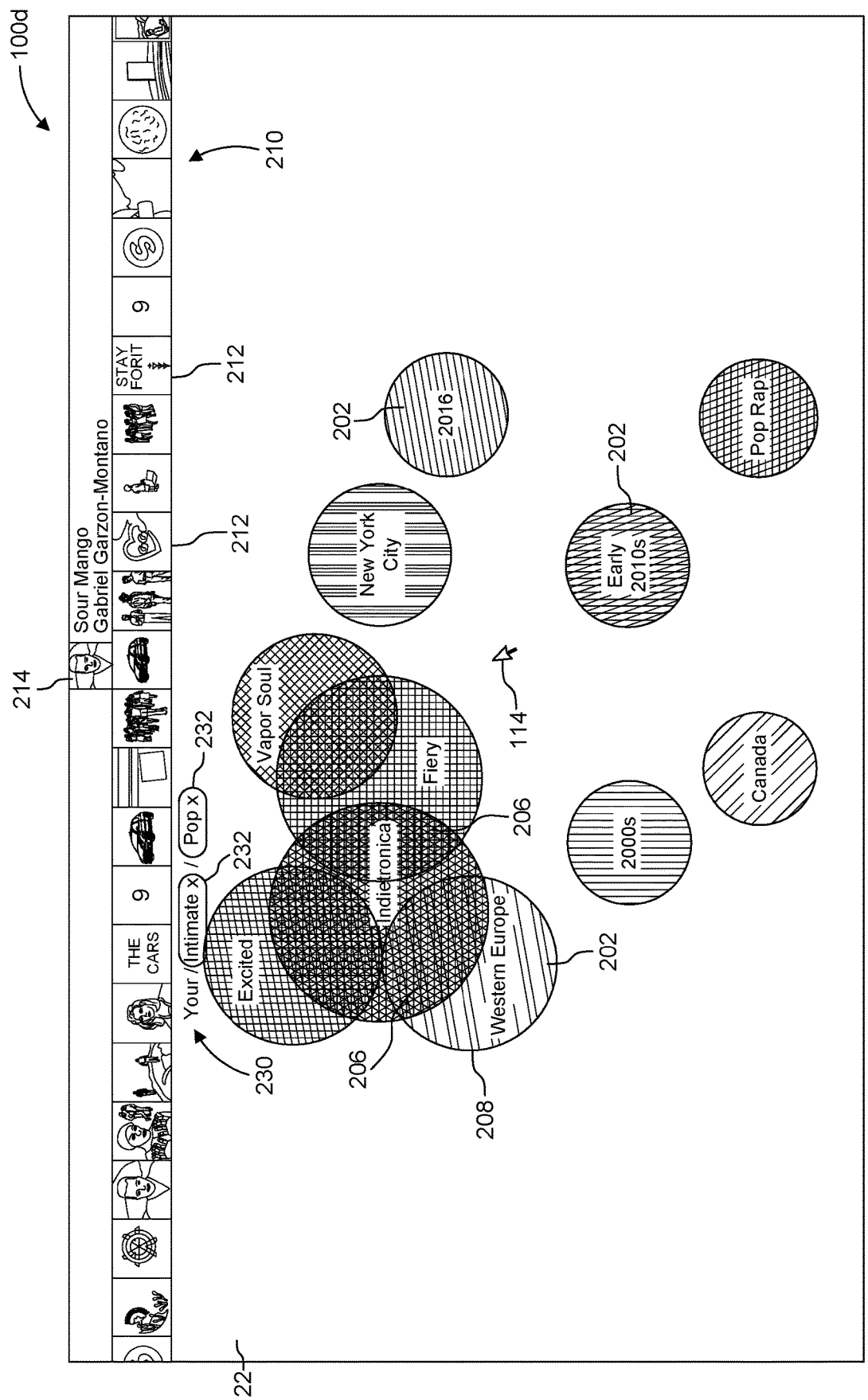
FIG. 5 depicts a further example visualization on a graphical display in accordance with the present disclosure.

Referring now to FIG. 5, a visualization 100*d* is depicted. The visualization 100*c* of FIG. 4 morphs into the visualization 100*d* of FIG. 5 when a user interacts in a particular selection manner with the visualization. In at least some examples, the type of interaction that constitutes a pre-selection interaction is different from the type of interaction that constitutes a selection interaction. For example, if a pre-selection is performed by single clicking on a region, a selection is performed by double clicking on the region. If a pre-selection is performed by hovering on a region, selection is performed by single clicking or double clicking on the region. Alternatively, pre-selection and selection interactions can include different voice commands, e.g., "view" or "sample", followed by an identification of a region of the visualization, for pre-selecting that region; and "navigate", followed by an identification of a region of the visualization, for selecting that region for further navigation.

In the particular example of FIG. 5, the visualization 100*d* is generated by double clicking the cursor 114 in the overlap region 106 between the Pop bubble 102 and the Intimate bubble 102 in FIG. 4, the double click constituting a selection interaction, i.e., the user has selected to navigate the union of Pop and Intimate tracks.

As a result of the selection interaction, a new set of bubbles 202 appear. The bubbles have overlapping regions 206 and non-overlapping regions 208. The bubbles 202 represent additional groupings of tracks that are both Pop and Intimate. In this example, the additional groupings include: Excited; Vapor Soul; Western Europe; Indietronica; Fiery; New York City; 2016; 2000s; Early 2010s; Canada; and Pop Rap. Thus, the visualization 100*d* is an optimized visualization generated by the PVE 18 applied to an already defined population consisting of Pop and Intimate tracks.

The selection interaction of the user is an input command through the user device 26 that is fed back to the PVE 18 (FIG. 1). The PVE 18 processes the input command and generates the new population of items and groupings represented in the visualization 100*d*. Thus, the overall population of items represented by the bubbles 202 in the visualization 100*d* differs from that of visualizations 100*a*, 100*b*, and 100*c*.

In generating the new population for visualization, the PVE 18, in some examples, uses one or more rules, such as those described above, in conjunction with the parameters set by the input command. In this example, the limiting parameters set by the input command and processed by the PVE 18 include that the new population 20 to be visually represented may include only items (tracks) that are tagged (e.g., with their metadata) as both Pop and Intimate.

In some examples, the PVE 18 causes the visualization 100*d* to include bubbles that represent, at least once, every single track from the corpus 16 that is tagged as both Pop and Intimate. In other examples, the visualization 100*d* represents a subset of the corpus of tracks that are tagged as both Pop and Intimate. Whether all or a subset of such tracks are represented depends on the rules executed by the PVE 18 to generate the new population represented in the visualization 100*d*, as described above.

Still referring to FIG. 5, a modified content summary element 230 is displayed in response to the selection. The summary element 230 includes toggles 232 indicating the groupings of tracks that are presently represented by the bubbles 202 of the visualization 100*d*. Thus, the toggles 232 include an Intimate toggle and a Pop toggle. If more than one toggle element 232 is visible and/or active, this indicates that an intersection or overlap region of groupings corresponding to those toggles is being represented by the bubbles 202, or simply that multiple groupings have been selected for navigation. If a single toggle element 232 is visible and/or active, this indicates that a non-overlapping region of a grouping corresponding to the toggle is being represented by the bubbles 202.

Each toggle 232 can be interacted with as another form of selection interaction (e.g., by clicking or double clicking on the X within the graphical element of the toggle) to change what tracks are represented by the bubbles on the visualization. For example, switching off the Pop toggle, in some examples, is equivalent to selecting the non-overlapping region of the Intimate bubble 102 in the visualization 100*c* of FIG. 4, resulting in another visualization generated by PVE 18 in which all of the tracks are tagged as Intimate tracks but not necessarily as also Pop.

Thus, selection interactions with the toggles 232 allow for efficient broadening navigation away from an already selected grouping or groupings of items, while selection interactions with the bubbles 102, 202 provide for efficient narrowing navigation within a grouping or intersection of groupings. In this way, the toggles 232 provide an additional navigation feature for efficiently visualizing different groupings of items from within the corpus 16 (FIG. 1).

Still referring to FIG. 5, the item sample array has changed to the item sample array 210 as a result of the user selection interaction to include pictorial items 212 that represent tracks tagged as both Intimate and Pop. Optionally, one of the pictorial items 212 also has a pictorial callout 214. In some examples, the callout 214 is of an album whose track is being played back as a result of a pre-selection or selection. In another example, the callout 214 is of an album whose track has the highest affinity amongst the tracks represented by the visualization 100d or represented by a bubble that is presently being pre-selected.

Figure 6:
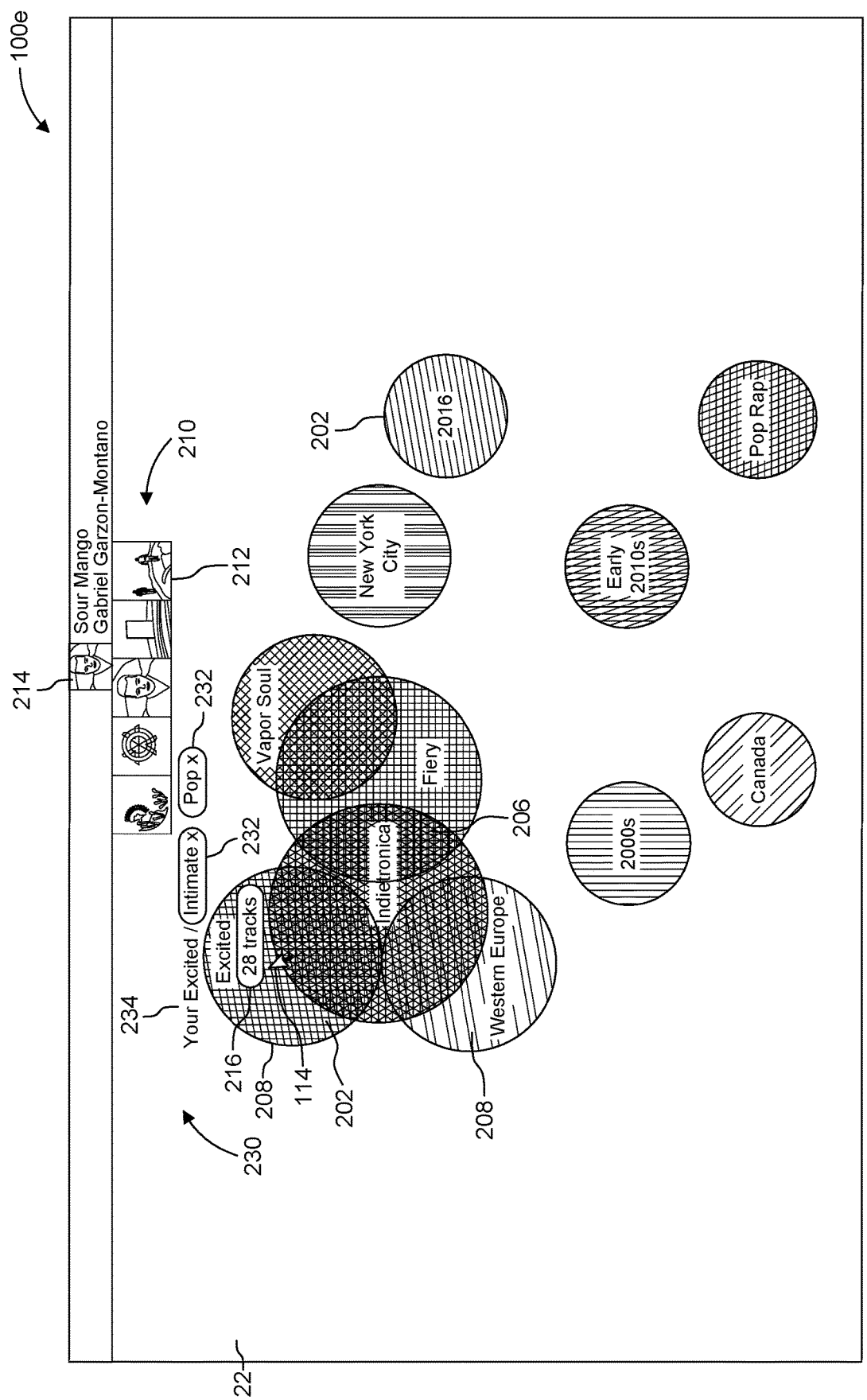
FIG. 6 depicts a further example visualization on a graphical display in accordance with the present disclosure.

Referring now to FIG. 6, a visualization 100e is depicted. The visualization 100d of FIG. 5 morphs into the visualization 100e of FIG. 6 when a user interacts in a pre-selection manner with the visualization. In particular, the user has pre-selected (e.g., by hovering the cursor 114) the non-overlapping region 208 of the Excited bubble 202 from the post-selection visualization 100d of FIG. 5.

The overall population of items represented by the bubbles 202 in the visualization 100e is the same as that of visualization 100d. Thus, the PVE 18 (FIG. 1) is not needed to generate the visualization 100e from the visualization 100d (FIG. 2).

As a result of the pre-selection, the indicator 234 of the content summary element 230 has changed to reflect the classification of the pre-selected region (i.e., Excited tracks), while the toggles 232 remain to indicate that the visualization 100e represents only those tracks tagged as both Intimate and Pop, and to allow broadening navigation by turning off either of the toggles. Also as a result of the pre-selection, an item number indicator 216 appears reflecting the number (i.e., 28) of Excited tracks that are also tagged as Intimate and Pop. In addition, the array 210 has changed to include a different set of pictorial items 212 reflective of the tracks represented by the pre-selected region 208.

The size of the bubbles is proportional to the size of the population being visualized. Thus, even though the population of items represented by the bubbles 202 is smaller than the population of items represented by the bubbles 102, the visual size of the bubbles 202 is still comparable to the visual size of the bubbles 102.

Figure 7:
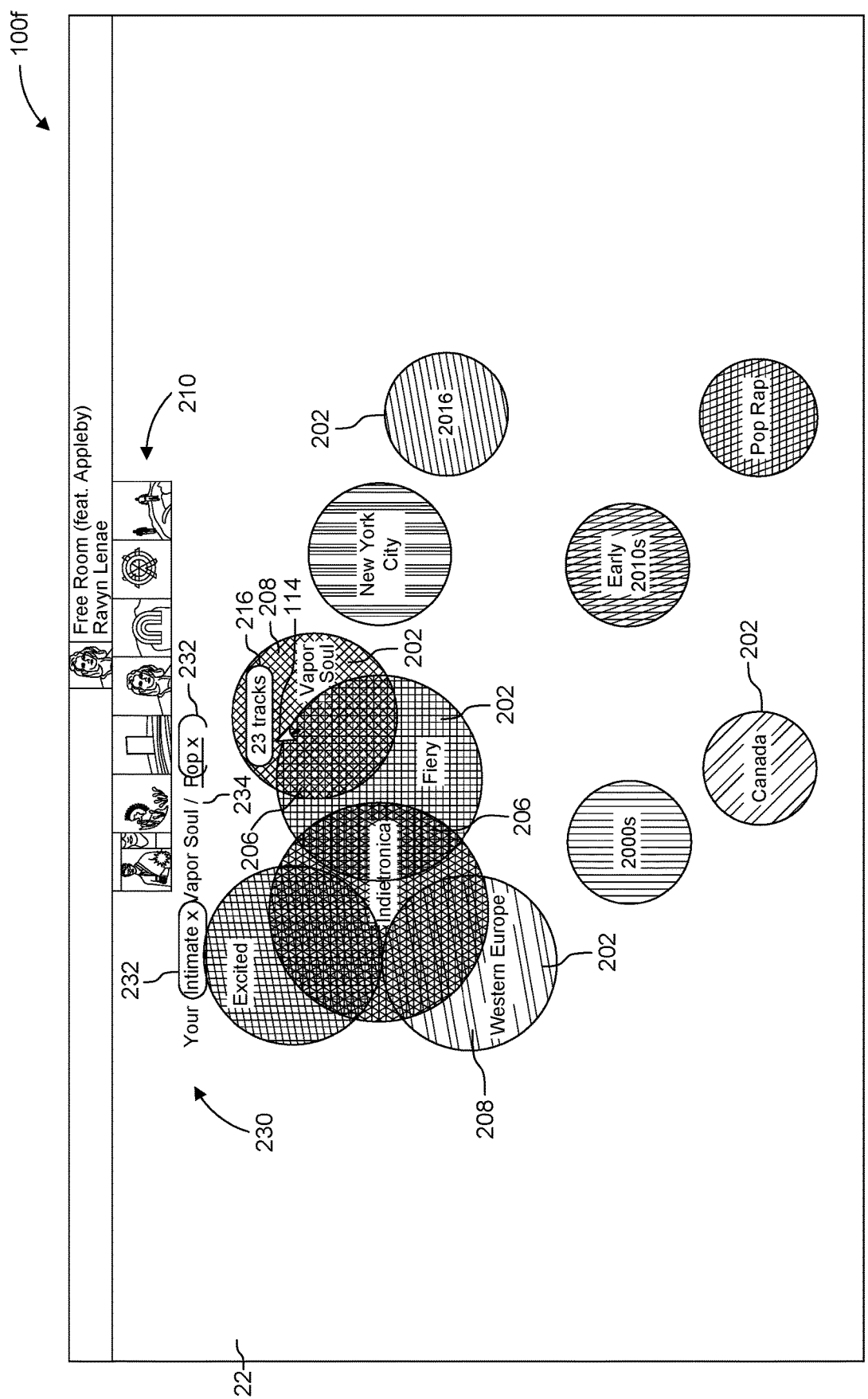
FIG. 7 depicts a further example visualization on a graphical display in accordance with the present disclosure.

Referring now to FIG. 7, a visualization 100f is depicted. The overall population of items represented by the bubbles 202 in the visualization 100f is the same as that of visualization 100e. Thus, the PVE 18 (FIG. 1) is not needed to generate the visualization 100f from the visualization 100e (FIG. 6).

The visualization 100f illustrates another visualization feature of a pre-selection interaction. In this example, the cursor 114 is hovering over the non-overlapping region 208 of the Vapor Soul bubble 202. An item number indicator 216 appears reflecting the number (i.e., 23) of Vapor Soul tracks that are also tagged as Intimate and Pop. In addition, the array 210 changes to present pictorial elements representing tracks within the pre-selected region.

The content summary element 230 changes to indicate the pre-selected grouping Vapor Soul. However, because Vapor Soul is a noun descriptor, as an indicator 234 it grammatically follows the Intimate toggle 232 in the content summary element 230. In contrast, in FIG. 6., the Excited descriptor of the pre-selected grouping is an adjective, and so precedes the toggles 232.

The relative positioning of toggles 232 and pre-selected indicators in the content summary element 230 is not limited by the specific examples shown in the figures. Rather, these examples reflect the ability of the system 10 (FIG. 1) to generate grammatically sensible content summary elements 230 in response to pre-selection and selection inputs via the user device 26.

Figure 8:
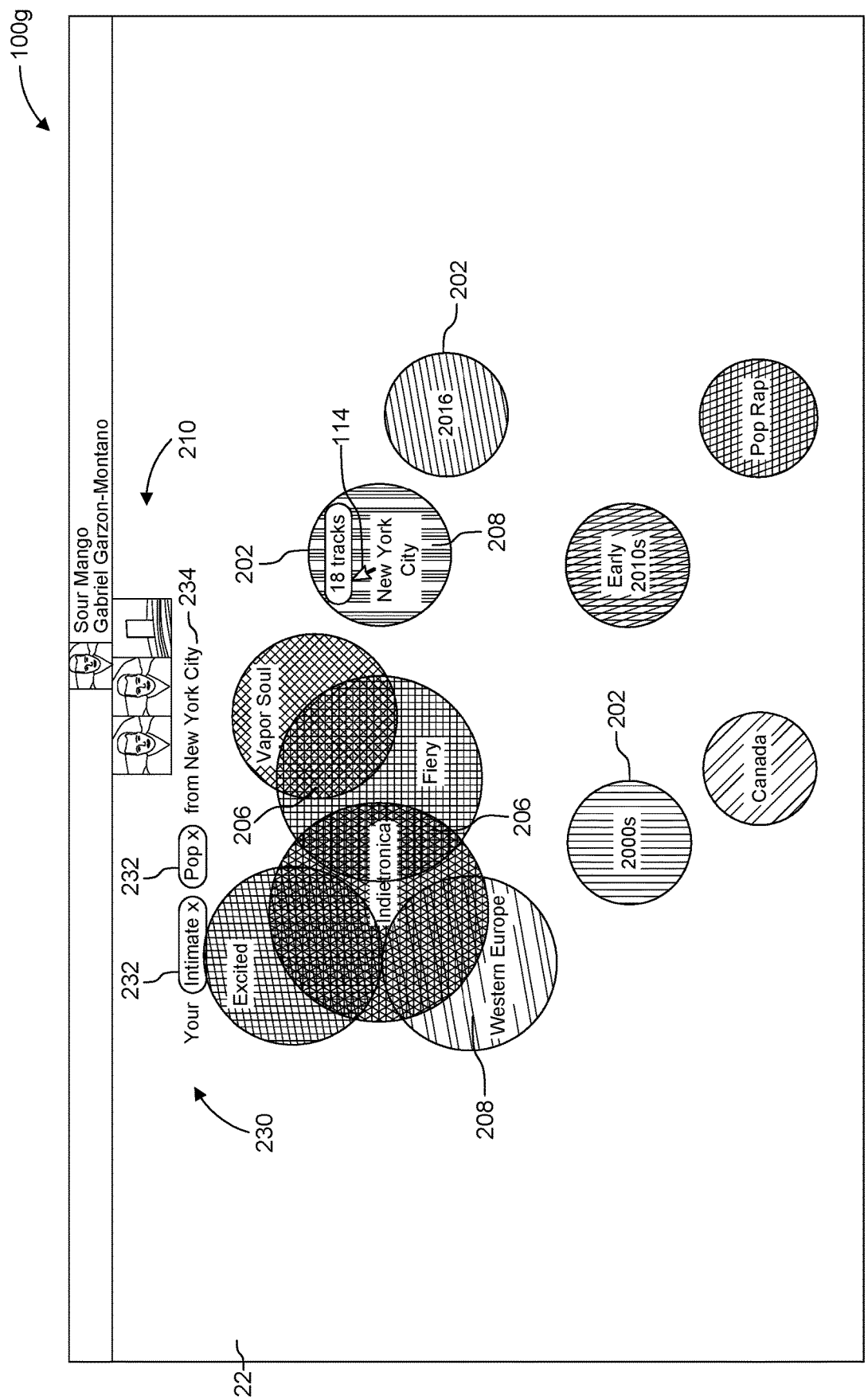
FIG. 8 depicts a further example visualization on a graphical display in accordance with the present disclosure.

Referring now to FIG. 8, a visualization 100g is depicted. The overall population of items represented by the bubbles 202 in the visualization 100g is the same as that of visualization 100f. Thus, the PVE 18 (FIG. 1) is not needed to generate the visualization 100g from the visualization 100f (FIG. 7).

In this example, the cursor 114 is hovering over the non-overlapping region 208 of the New York City bubble 202 to pre-select that region. An item number indicator 216 appears reflecting the number (i.e., 18) of tracks from New York City that are also tagged as Intimate and Pop. In addition, the item sample array 210 changes to present pictorial elements representing tracks within the pre-selected region.

The content summary element 230 changes to include the indicator 234 of the pre-selected region. The revised content summary element 230 is structured to make grammatical sense by following the toggles Intimate and Pop with the indicator 234, and expressing the indicator 234 with the preposition "from" such that the entire content summary element 230 reads "Your Intimate Pop from New York City".

Figure 9:
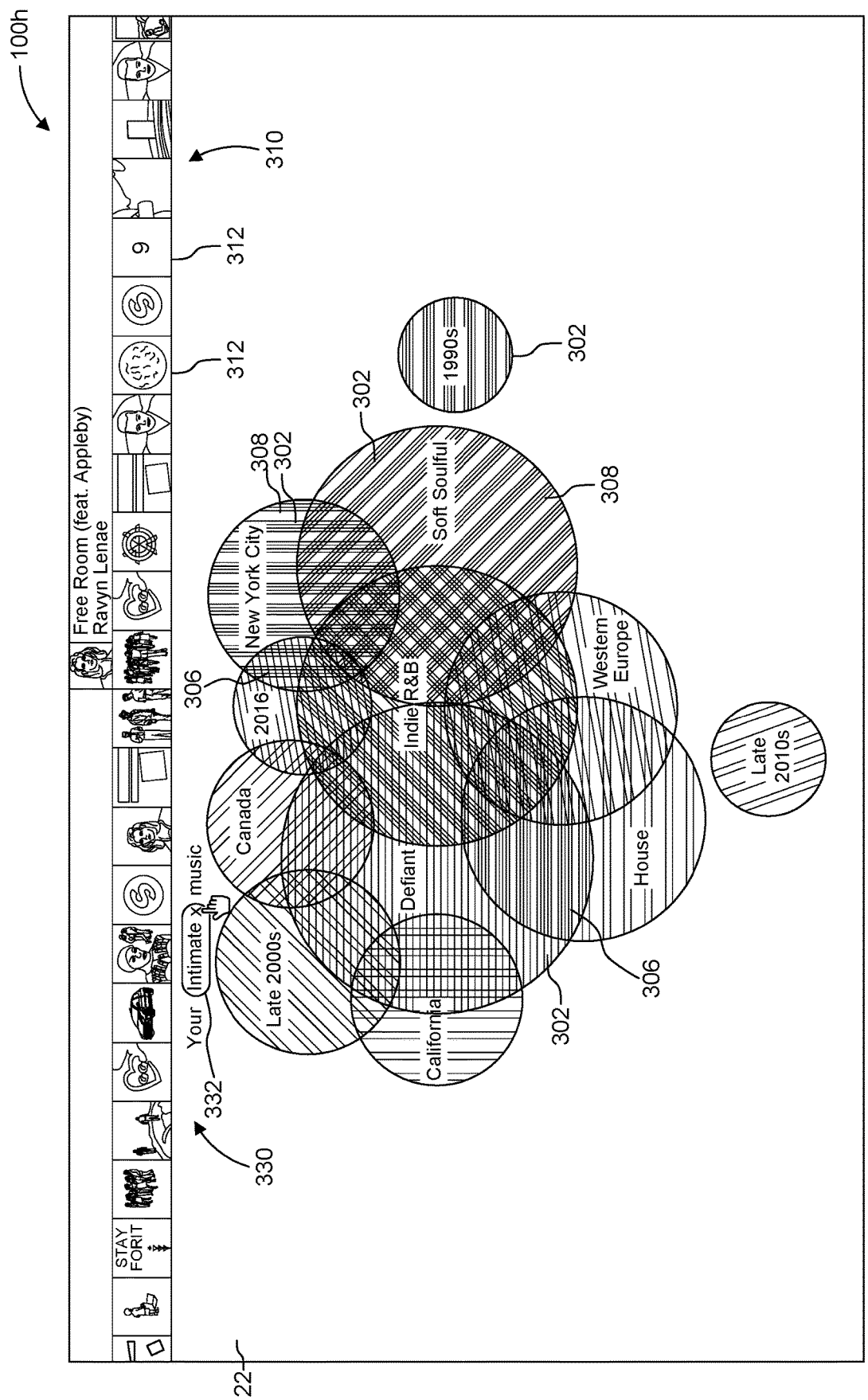
FIG. 9 depicts a further example visualization on a graphical display in accordance with the present disclosure.
Figure 10:
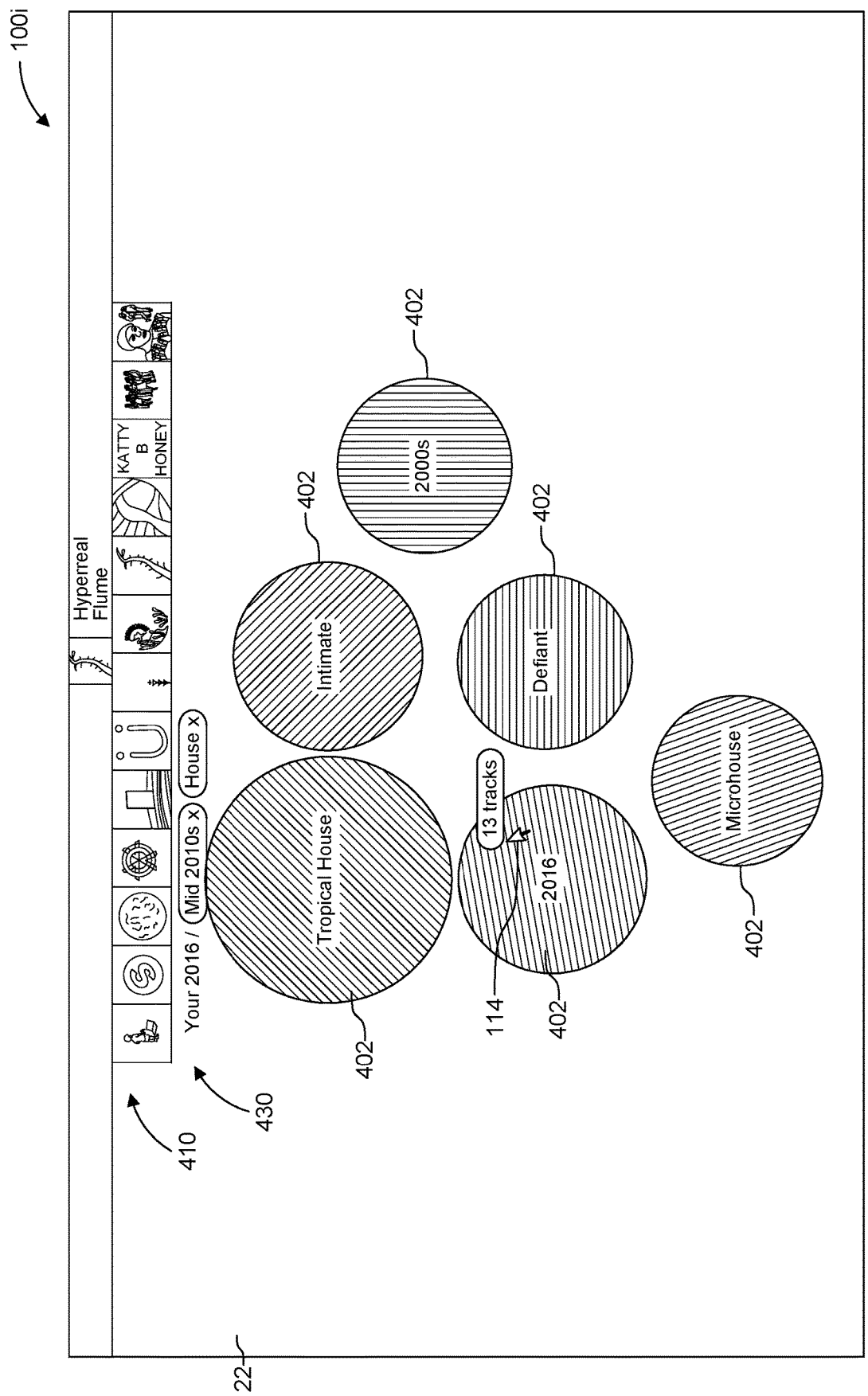
FIG. 10 depicts a further example visualization on a graphical display in accordance with the present disclosure.

Referring now to FIG. 9, a visualization 100h is depicted. The visualization 100g of FIG. 8 morphs into the visualization 100h of FIG. 9 when a user performs a selection interaction with the visualization 100g. In this example, the selection interaction is switching off the Pop toggle 232 in the visualization 100g.

By switching off the Pop toggle 232 the population for visualization broadens to include tracks that fall under the Intimate grouping, whether or not those tracks are also Pop tracks.

As a result of the selection interaction, a new set of bubbles 302 appear. The bubbles 302 have overlapping regions 306 and non-overlapping regions 308. The bubbles 302 represent additional groupings of tracks that are also Intimate. In this example, the additional groupings include: Late 2000s; Canada; 2016; New York City; California; Defiant; Indie R&B; Soft Soulful; 1990s; House; Western Europe; and Late 2010s.

The selection interaction of the user (switching off the Pop toggle 232) is an input command through the user device 26 that is fed back to the PVE 18 (FIG. 1). The PVE 18 processes the input command and generates the new population of items and groupings represented in the visualization 100h. Thus, the overall population of items represented by the bubbles 302 in the visualization 100h differs from that of the visualization 100g; it also differs from the population of items represented by the visualization 100a. In some examples, the PVE 18 uses one or more of the rules described above to generate the population and groupings to be visualized in the visualization 100h.

In addition, the content summary element 330 has changed to reflect that the Pop toggle has been switched off, and the item sample array 310 having pictorial items 312 has changed to reflect the new visualized population.

In some examples, switching off the Intimate toggle 332 in the visualization 100h automatically causes the visualization to revert to its original configuration 100a. In other examples, switching off the Intimate toggle 332 is an input command that is fed back to the PVE 18 (FIG. 1) and the PVE generates a population and groupings for visualization representative of the entire corpus, where the visualization may or may not be the same as the visualization 100a.

It should be appreciated that not every visualization need have one or more overlap regions. For example, the PVE 18 (FIG. 1) provides a population and groupings for visualization in which none of the groupings shares an item with another grouping. An example of such a visualization is the visualization 100i depicted in FIG. 10, in which a plurality of bubbles 402 are displayed and none of the bubbles 402 overlap with each other. The bubbles 402 represent a population of tracks that are both Mid 2010s and House (e.g., an overlap region between a Mid 2010s bubble and a House bubble has already been selected). From within this population, the user has pre-selected the 2016 bubble 402 and the content summary element 430 and the item sample array 410 have been updated accordingly.

It should be appreciated that each visualization, including but not limited to the example visualizations 100a through 100i described herein, can be adapted to provide pre-selection functionality and selection functionality as described above. For example, hovering over the overlapping region 206 in the intersection of the Vapor Soul and Fiery bubbles 202 in FIG. 7 causes playback of a track tagged as Intimate, Pop, Fiery and Vapor Soul, where the track played back is selected randomly or due to an attribute of that track, such as its affinity or recent affinity.

Figure 11:
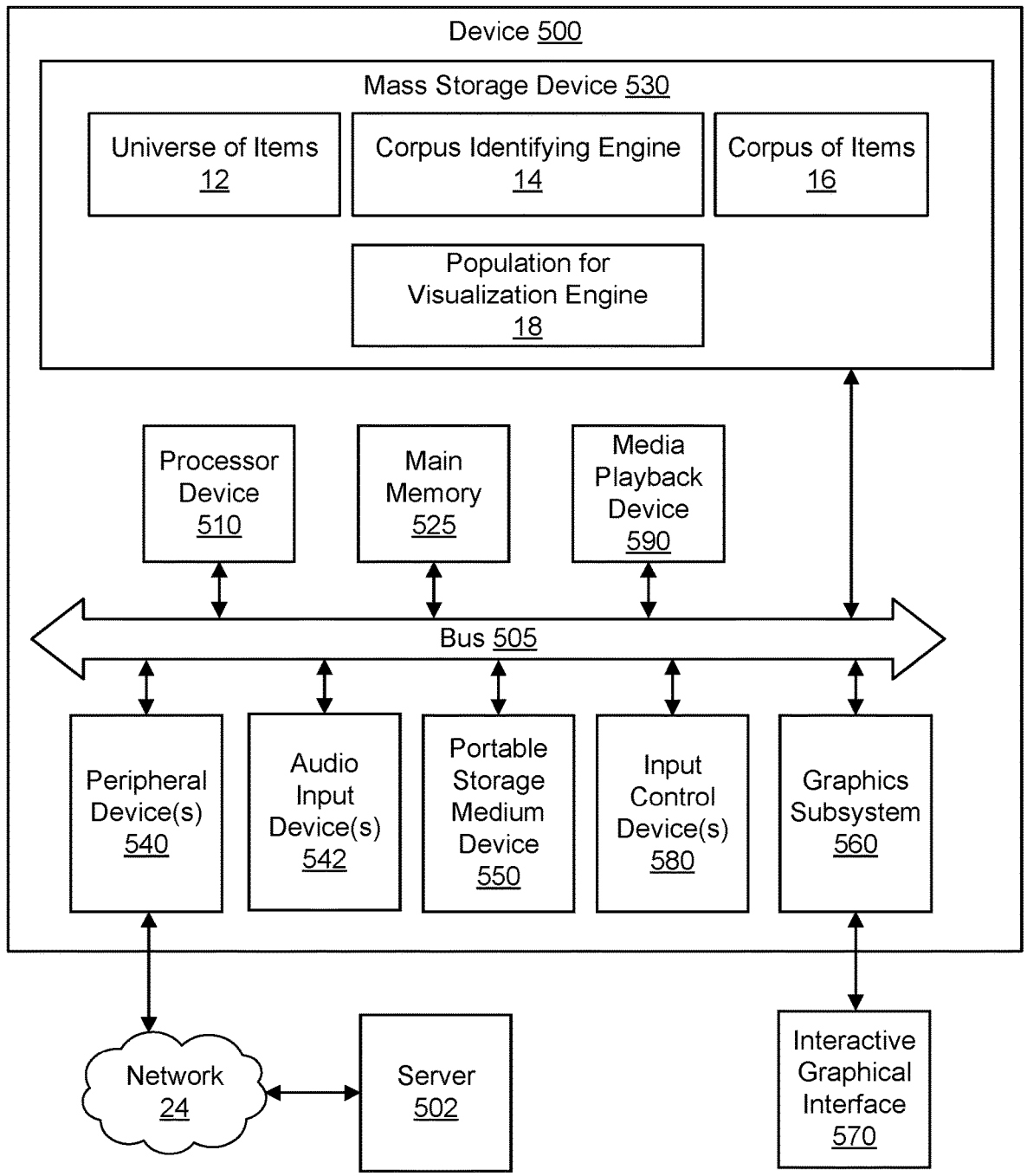
FIG. 11 is a block diagram showing an exemplary device constructed to realize one or more aspects of the example embodiments described herein.

FIG. 11 is a block diagram showing an exemplary device 500 constructed to realize one or more aspects of the example embodiments described herein. In some examples, the device 500 corresponds to the user device 26. In these examples, the device 26 may be connected over the network 24 to one or more servers 502 or other remote devices. The one or more servers 502 can include one or more components described below in relation to the device 500, including a mass storage device and a processor device. That is, various operations and processes described herein can be performed by the cooperation of two or more devices, systems, processes, or combinations thereof. Such a division of operations provides for efficient use of computing resources because servers are generally more powerful than the user device 26.

In other examples, the device 500 is at least partially remote from the user device 26 and linkable to the user device 26 via the network 24; thus, all or portions of the device 500 correspond, in some examples, to components of one or more servers remotely accessible by the user device 26. For example, the device 500 includes one or more of the components of the system 10 other than the user device 26.

The device 500 includes a processing device 510. Also included are a main memory 525 and an interconnect bus 505. The processor device 510 may include without limitation a single microprocessor, or may include a plurality of microprocessors for configuring the device 500 for providing navigable visual representations of populations of items on a graphical interface. The main memory 525 stores, among other things, instructions and/or data for execution by the processor device 510. The main memory 525 may include banks of dynamic random access memory (DRAM), as well as cache memory.

The device 500 may further include a mass storage device 530, peripheral device(s) 540, audio input device(s) 542 (e.g., a microphone), portable non-transitory storage medium device(s) 550, input control device(s) 580, a media playback device 590 (e.g., a speaker), a graphics subsystem 560, and/or an output interactive graphical interface 570 which includes the graphical display 22. For explanatory purposes, all components in the device 500 are shown in FIG. 11 as being coupled via the bus 505. However, the device 500 is not so limited. Elements of the device 500 may be coupled via one or more data transport means. For example, the processor device 510, and/or the main memory 525 may be coupled via a local microprocessor bus. The mass storage device 530, peripheral device(s) 540, portable storage medium device(s) 550, and/or graphics subsystem 560 may be coupled via one or more input/output (I/O) buses. The mass storage device 530 may be a nonvolatile storage device for storing data and/or instructions for use by the processor device 510. The mass storage device 530 can also store the items themselves, e.g., the universe of items 12 and/or the corpus of items 16, including any metadata (e.g., tags) associated with the items. The mass storage device 530 may be implemented, for example, with a magnetic disk drive or an optical disk drive. In a software embodiment, the mass storage device 530 is configured for loading contents of the mass storage device 530 into the main memory 525. Memory may be embodied as one or more of mass storage device 530, main memory 525, or portable storage medium device 550.

Mass storage device 530 may additionally store the Corpus Identifying Engine 14 and/or the Population for Visualization Engine 18. The mass storage device 530 may also include software that, when executed, causes the device 500 to perform the features described above, including but not limited to the functions of the Corpus Identifying Engine 14 and/or the Population for Visualization Engine 18.

The portable storage medium device 550 operates in conjunction with a nonvolatile portable storage medium, such as, for example, a solid state drive (SSD), to input and output data and code to and from the device 500. In some embodiments, the software for storing information may be stored on a portable storage medium, and may be inputted into the device 500 via the portable storage medium device 550. The peripheral device(s) 540 may include any type of computer support device, such as, for example, an input/output (I/O) interface configured to add additional functionality to the device 500. For example, the peripheral device(s) 540 may include a network interface card for interfacing the device 500 with a network 24. The audio input devices 542 may be one or more devices configured to receive or obtain audio and provide a representation of the audio (e.g., as an audio clip or file) as output. Thus, the audio input device(s) 542 may include one or more microphones or other devices.

The input control device(s) 580 provide a portion of an interface for the device 500. The input control device(s) 580 may include a keypad and/or a cursor control and/or a touch screen. The keypad may be configured for inputting alphanumeric characters and/or other key information. The cursor control device may include, for example, a handheld controller or mouse, a rotary input mechanism, a trackball, a stylus, and/or cursor direction keys. In order to display textual and graphical information, the device 500 may include the graphics subsystem 560 and the interactive graphical interface 570. The interactive graphical interface 570 may include the graphical display 22 and may include a display such as a TFT (Thin Film Transistor), TFD (Thin Film Diode), OLED (Organic Light-Emitting Diode), AMO-LED display (active-matrix organic light-emitting diode), and/or liquid crystal display (LCD)-type displays. The displays can also be touchscreen displays, such as capacitive and resistive-type touchscreen displays.

The graphics subsystem 560 receives textual and graphical information, e.g., population and grouping output from the PVE 18, and processes the information for output to the output display of the interactive graphical interface 570.

Input control devices 580 can control the operation and various functions of device 500. Input control devices 580 can include any components, circuitry, or logic operative to drive the functionality of device 500. For example, input control device(s) 580 can include one or more processors acting under the control of an application.

Each component of the device 500 may represent a broad category of a computer component of a general and/or special purpose computer. Components of the device 500 are not limited to the specific implementations provided herein.

Software embodiments of the examples presented herein may be provided as a computer program product, or software that may include an article of manufacture on a machine-accessible or machine-readable media having instructions. The instructions on the non-transitory machine-accessible, machine-readable or computer-readable medium may be used to program a computer system or other electronic device. The machine- or computer-readable medium may include, but is not limited to, magnetic disks, optical disks, magneto-optical disks, or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine, and which causes the machine to perform any one of the methods described herein. Further, it is common in the art to speak of software, in one form or another (e.g., program, procedure, process, application, module, engine, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein that can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A system for playback of a media content item, comprising:
   one or more processors adapted to:
      provide, via a graphical interface, a graphical display, a first graphical element of the graphical display representing a first grouping of media content items from a corpus of media content items stored in at least one storage device, and a second graphical element of the graphical display representing a second grouping of media content items from the corpus of media content items, the first grouping and the second grouping of media content items representing media content items of a first population in accordance with a classification scheme, the classification scheme based on the respective classes of the media content items of the corpus, the first grouping and the second grouping being a predetermined size, the predetermined size based on the size of at least one other grouping, the size of the first grouping and the size of the second grouping having a preset maximum differential;
      partially overlap the first graphical element and the second graphical element in an overlap region of the graphical display;
      cause a playback, via a speaker, of at least a portion of a media content item that is in both the first grouping and the second grouping when a user interacts with the overlap region via the graphical user interface; and
      tag each media content item of the corpus with at least one tag representing a class that media content item belongs to, said tag being stored as an attribute linked to the media content item.

2. The system of claim 1,
   wherein a visual size of the first graphical element correlates to a number of media content items in the first grouping; and
   wherein a visual size of the second graphical element correlates to a number of media content items in the second grouping.

3. The system of claim 1,
   wherein a visual size of the first graphical element correlates to a proportion of a number of media content items in the first grouping to a total number of media content items visually represented on the graphical display; and
   wherein a visual size of the second graphical element correlates to a proportion of a number of media content items in the second grouping to the total number of media content items visually represented on the graphical display.

4. The system of claim 1,
wherein the graphical display is a first graphical display of the graphical interface; wherein a total number of media content items visually represented on the first graphical display is the first population of media content items;
wherein the interaction with the graphical interface is a first type of interaction; and
wherein a second type of interaction of the user with the overlap region of the first graphical display of the graphical interface, different from the first type of interaction, causes a second population of media content items to be visually represented in graphical elements representing additional groupings of media content items, via the graphical interface, on a second graphical display that is different from the first graphical display, the second population being a subset of the first population and corresponding to the media content items which are in both the first grouping and the second grouping, resulting in narrowing navigation within the overlap between the first grouping and the second grouping.

5. The system of claim 4, wherein the second type of interaction with the graphical interface causes at least a third visual element representing a third grouping of media content items to be displayed, via the graphical interface, on the graphical display, the third grouping being different from the first and second groupings.

6. The system of claim 5,
wherein the one or more processors are further adapted, in response to the second type of interaction, to provide, via the graphical interface, a toggle element on the second graphical display; and
wherein the user switching off the toggle via the graphical interface causes the one or more processors to provide a third population of media content items to be visually represented on a third graphical display of the graphical interface, the third graphical display being the same as or different from the first graphical display, the third population being a superset of the second population, resulting in broadening navigation.

7. The system of claim 4,
wherein the one or more processors are further adapted, in response to the second type of interaction, to provide, via the graphical interface, a toggle element on the second graphical display; and
wherein the user switching off the toggle via the graphical interface causes the one or more processors to provide a third population of media content items to be visually represented on a third graphical display of the graphical interface, the third graphical display being the same as or different from the first graphical display, the third population being a superset of the second population, resulting in broadening navigation.

8. A system comprising:
one or more processors adapted to:
select, from a corpus of media content items stored on at least one storage device, a population of media content items to be represented, via a graphical interface, on a graphical display, wherein each media content item of the corpus is tagged with at least one tag representing a class that media content item belongs to, said tag being stored as an attribute linked to the media content item;
choose at least a first grouping and a second grouping of media content items from the population of media content items, each of the first and second groupings having at least a predefined minimum number of the media content items relative to the population and at most a predefined maximum number of the media content items relative to the population, wherein the first and second groupings of media content items represent media content items of a first population in accordance with a classification scheme, the classification scheme based on the respective classes of the media content items of the corpus, the first grouping and the second grouping being a predetermined size, the predetermined size based on the size of at least one other grouping, the size of the first grouping and the size of the second grouping having a preset maximum differential;
display, on the graphical display via the graphical interface, a first graphical element representing the first grouping of media content items; and
display, on the graphical display via the graphical interface, a second graphical element representing the second grouping of media content items;
wherein the first graphical element and the second graphical element partially overlap on the graphical display.

9. A non-transitory computer-readable medium, comprising:
one or more sequences of instructions that, when executed by one or more processors, causes the one or more processors to:
select, from a corpus of media content items stored on at least one storage device, a population of media content items to be represented, via a graphical interface, on a graphical display, wherein each media content item of the corpus is tagged with at least one tag representing a class that media content item belongs to, said tag being stored as an attribute linked to the media content item;
choose at least a first grouping and a second grouping of media content items from the population of media content items, each of the first and second groupings having at least a predefined minimum number of the media content items relative to the population and at most a predefined maximum number of the media content items relative to the population, wherein the first and second groupings of media content items represent media content items of a first population in accordance with a classification scheme, the classification scheme based on the respective classes of the media content items of the corpus, the first grouping and the second grouping being a predetermined size, the predetermined size based on the size of at least one other grouping, the size of the first grouping and the size of the second grouping having a preset maximum differential;
provide, on the graphical display via the graphical interface, a first graphical element representing the first grouping of media content items; and
provide, on the graphical display via the graphical interface, a second graphical element representing the second grouping of media content items;
wherein the first graphical element and the second graphical element partially overlap on the graphical display.

10. A system, comprising:
one or more processors adapted to:
  select a population of media content items from a corpus of media content items, stored on at least one storage device, to be represented, via a graphical interface on a graphical display, wherein each media content item of the corpus is tagged with at least one tag representing a class that media content item belongs to, said tag being stored as an attribute linked to the media content item; and
  choose at least a first grouping and a second grouping of media content items from the population of media content items, wherein the first and second groupings of media content items represent media content items of a first population in accordance with a classification scheme, the classification scheme based on the respective classes of the media content items of the corpus, the first grouping and the second grouping being a predetermined size, the predetermined size based on the size of at least one other grouping, the size of the first grouping and the size of the second grouping having a preset maximum differential;
  wherein the choice includes one or more of:
    a) maximizing the number of media content items from the population within at least one of the groupings,
    b) excluding a pair of groupings that share more than a first threshold number of media content items, and
    c) identifying at least two groupings that differ from each other in number of media content items by less than a second threshold number of media content items.

11. A method, comprising:
selecting a population of media content items from a corpus of media content items, stored on at least one storage device, to be represented, via a graphical interface, on a graphical display, wherein each media content item of the corpus is tagged with at least one tag representing a class that media content item belongs to, said tag being stored as an attribute linked to the media content item; and
choosing at least a first grouping and a second grouping of media content items from the population of media content items, wherein the first and second groupings of media content items represent media content items of a first population in accordance with a classification scheme, the classification scheme based on the respective classes of the media content items of the corpus, the first grouping and the second grouping being a predetermined size, the predetermined size based on the size of at least one other grouping, the size of the first grouping and the size of the second grouping having a preset maximum differential;
  wherein the choosing includes one or more of:
    a) maximizing the number of media content items from the population within at least one of the groupings,
    b) excluding a pair of groupings that share more than a first threshold number of media content items, and
    c) identifying at least two groupings that differ from each other in number of media content items by less than a second threshold number of media content items.

12. The method of claim 11, wherein b) is performed, and wherein the first threshold number of media content items is at least partially a function of a total number of media content items in the population.

13. The method of claim 12, wherein c) is performed, and wherein the second threshold number of media content items is at least partially a function of a total number of media content items in the population.

14. The method of claim 11, wherein c) is performed, and wherein the second threshold number of media content items is at least partially a function of a total number of media content items in the population.

15. A non-transitory computer-readable medium comprising:
one or more sequences of instructions that, when executed by one or more processors, causes the one or more processors to:
  provide, via a graphical interface, a graphical display, a first graphical element of the graphical display representing a first grouping of media content items from a corpus of media content items stored on at least one storage device, and a second graphical element of the graphical display representing a second grouping of media content items from the corpus of media content items, the first graphical element and the second graphical element partially overlapping in an overlap region of the graphical display, the first grouping and the second grouping of media content items representing media content items of a first population in accordance with a classification scheme, the classification scheme based on the respective classes of the media content items of the corpus, the first grouping and the second grouping being a predetermined size, the predetermined size based on the size of at least one other grouping, the size of the first grouping and the size of the second grouping having a preset maximum differential;
  in response to an interaction of a user, via the graphical interface, with the overlap region, cause a playback, via a speaker, of at least a portion of a media content item that is in both the first grouping and the second grouping; and
  tag each media content item of the corpus with at least one tag representing a class that media content item belongs to, said tag being stored as an attribute linked to the media content item.

* * * * *